(12) United States Patent
Marks

(10) Patent No.: US 11,164,421 B2
(45) Date of Patent: Nov. 2, 2021

(54) DIGITAL TABLE GAME SYSTEMS AND METHODS

(71) Applicant: Aristocrat Technologies, inc., Las Vegas, NV (US)

(72) Inventor: Daniel Mordecai Marks, Decatur, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 16/899,525

(22) Filed: Jun. 11, 2020

(65) Prior Publication Data

US 2020/0302748 A1 Sep. 24, 2020

Related U.S. Application Data

(63) Continuation-in-part of application No. 29/663,818, filed on Sep. 19, 2018, now Pat. No. Des. 889,556.

(51) Int. Cl.
| | |
|---|---|
| *G07F 17/32* | (2006.01) |
| *G06Q 20/20* | (2012.01) |
| *G06Q 20/12* | (2012.01) |
| *G06Q 10/08* | (2012.01) |
| *G06Q 30/06* | (2012.01) |
| *G06K 7/10* | (2006.01) |
| *G06Q 50/34* | (2012.01) |
| *G07F 17/34* | (2006.01) |
| *G06Q 50/12* | (2012.01) |

(52) U.S. Cl.
CPC ..... *G07F 17/3255* (2013.01); *G06K 7/10366* (2013.01); *G06Q 10/087* (2013.01); *G06Q 20/123* (2013.01); *G06Q 20/202* (2013.01); *G06Q 20/204* (2013.01); *G06Q 20/209* (2013.01); *G06Q 30/0635* (2013.01); *G07F 17/3209* (2013.01); *G07F 17/3213* (2013.01); *G07F 17/3216* (2013.01); *G07F 17/3225* (2013.01); *G07F 17/3276* (2013.01); *G06Q 50/12* (2013.01); *G06Q 50/34* (2013.01); *G07F 17/3239* (2013.01); *G07F 17/34* (2013.01)

(58) Field of Classification Search
USPC .......................................... 463/25
See application file for complete search history.

(56) References Cited

U.S. PATENT DOCUMENTS

| | | |
|---|---|---|
| D32,139 S | 1/1900 | Weathersby |
| D172,366 S | 6/1954 | Salmon |
| | (Continued) | |

*Primary Examiner* — Pierre E Elisca
(74) *Attorney, Agent, or Firm* — Armstrong Teasdale LLP

(57) ABSTRACT

A gaming system includes an EGM having a horizontally mounted display device, a reader device configured to wirelessly detect tagged items. The EGM is configured to detect, using the reader device, the presence of a first tagged item and determine a tag identifier (ID) of the first tagged item. The EGM is also configured to transmit a tag detection message to a gaming support server and receive, from the gaming support server, a response message including an amount of play credits to be added to a credit meter of the EGM. The EGM is further configured to increment a first credit meter on the EGM by the amount of play credits identified in the response message and to conduct instances of game play of an electronic game on the display device, each instance of game play decrementing the first credit meter to enable play.

20 Claims, 11 Drawing Sheets

(56) References Cited

U.S. PATENT DOCUMENTS

| | | |
|---|---|---|
| D172,367 S | 6/1954 | Salmon |
| 3,853,679 A | 12/1974 | Ierenzoni |
| 5,236,193 A | 8/1993 | Ierulli |
| 5,688,174 A | 11/1997 | Kennedy |
| 5,913,519 A | 6/1999 | Sindelar |
| D444,508 S | 7/2001 | George |
| D466,161 S | 11/2002 | Takahashi |
| D494,635 S | 8/2004 | Wright |
| D520,068 S | 5/2006 | Hirato |
| D521,074 S | 5/2006 | Hirato |
| D549,785 S | 8/2007 | Luciano, Jr. |
| 7,288,024 B2 | 10/2007 | Toyoda |
| D579,500 S | 10/2008 | Luciano, Jr. |
| D595,783 S | 7/2009 | Anderson |
| D609,279 S | 2/2010 | Kristensson |
| D614,244 S | 4/2010 | Inoue |
| D641,047 S | 7/2011 | Tahara |
| D646,336 S | 10/2011 | Kelly |
| D714,875 S | 10/2014 | Wudtke |
| D715,364 S | 10/2014 | Wudtke |
| 2005/0164762 A1 | 7/2005 | Smith |
| 2007/0066387 A1 | 3/2007 | Matsuno |
| 2008/0070663 A1 | 3/2008 | Losilevsky |
| 2008/0182662 A1 | 7/2008 | Yoshizawa |
| 2009/0239625 A1 | 9/2009 | Yoshizawa |
| 2011/0287824 A1 | 11/2011 | Schultz |
| 2016/0225228 A1* | 8/2016 | Weber ............... G07F 17/32 |
| 2018/0322723 A1* | 11/2018 | LeMay ............ G07F 17/3223 |
| 2019/0244478 A1* | 8/2019 | Weber ............ G07F 17/3239 |
| 2020/0090453 A1* | 3/2020 | Nelson ................ A63F 13/25 |
| 2020/0160666 A1* | 5/2020 | Lutnick ........... G07F 17/3293 |
| 2020/0402345 A1* | 12/2020 | Nelson ............ G07F 17/3267 |
| 2020/0410810 A1* | 12/2020 | Higgins ........... G07F 17/3211 |

\* cited by examiner ic gaming, and more particularly to digital table electronic gaming systems and methods for evaluating a digital table electronic game.

DIGITAL TABLE GAME SYSTEMS AND METHODS

CROSS-REFERENCE TO RELATED APPLICATIONS

The present application is a continuation-in-part of, and claims priority to, U.S. Design patent application Ser. No. 29/663,818, filed Sep. 19, 2018, and entitled "SLOT TABLE HYBRID DESIGN," which is hereby incorporated by reference in its entirety.

TECHNICAL FIELD

The field of disclosure relates generally to electronic gaming, and more particularly to digital table electronic gaming systems and methods for evaluating a digital table electronic game.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

In one aspect, a gaming system is provided. The gaming system includes an electronic gaming machine (EGM). The EGM includes a display device horizontally mounted in a cabinet housing such that a top surface of the display device is horizontal and forms some or all of a table surface. The EGM also includes a reader device configured to wirelessly detect tagged items within a detection range. The EGM further includes an EGM processor configured to execute instructions stored in a memory that, when executed, cause the EGM processor to at least detect, using the reader device, the presence of a first tagged item within the detection range. The instructions also cause the EGM processor to determine a tag identifier (ID) of the first tagged item. The instructions further cause the EGM processor to transmit a tag detection message to a gaming support server. The tag detection message includes the tag ID of the first tagged item. The instructions also cause the EGM processor to receive, from the gaming support server, a response message including an amount of play credits to be added to a credit meter of the EGM. The instructions further cause the EGM processor to increment a first credit meter on the EGM by the amount of play credits identified in the response message. The instructions also cause the EGM processor to conduct instances of game play of an electronic game on the display device, each instance of game play decrementing the first credit meter to enable play.

In another aspect, an electronic gaming machine (EGM) is provided. The EGM includes a display device horizontally mounted in a cabinet housing such that a top surface of the display device is horizontal and forms some or all of a table surface. The EGM also includes a reader device configured to wirelessly detect tagged items within a detection range. The EGM further includes an EGM processor configured to execute instructions stored in a memory that, when executed, cause the EGM processor to at least detect, using the reader device, the presence of a first tagged item within the detection range. The instructions also cause the EGM processor to determine a tag identifier (ID) of the first tagged item. The instructions further cause the EGM processor to transmit a tag detection message to a gaming support server. The tag detection message includes the tag ID of the first tagged item. The instructions also cause the EGM processor to receive, from the gaming support server, a response message including an amount of play credits to be added to a credit meter of the EGM. The instructions further cause the EGM processor to increment a first credit meter on the EGM by the amount of play credits identified in the response message. The instructions also cause the EGM processor to conduct instances of game play of an electronic game on the display device, each instance of game play decrementing the first credit meter to enable play.

In yet another aspect, a method of providing an electronic game is provided. The method includes detecting, using a reader device of an EGM, the presence of a first tagged item within a detection range. The method also includes determining a tag identifier (ID) of the first tagged item. The method further includes transmitting a tag detection message to a gaming support server. The tag detection message includes the tag ID of the first tagged item. The method also includes receiving, from the gaming support server, a response message including an amount of play credits to be added to a credit meter of the EGM. The method also includes incrementing a first credit meter on the EGM by the amount of play credits identified in the response message. The method further includes conducting instances of game play of the electronic game on the display device, each instance of game play decrementing the first credit meter to enable play.

In still another aspect, a non-transitory computer-readable medium is provided. The computer-readable medium includes instructions that, when executed by a processor, cause the processor to detect, using a reader device of an EGM, the presence of a first tagged item within a detection range. The instructions also cause the processor to determine a tag identifier (ID) of the first tagged item. The instructions further cause the processor to transmit a tag detection message to a gaming support server. The tag detection message includes the tag ID of the first tagged item. The instructions also cause the processor to receive, from the gaming support server, a response message including an amount of play credits to be added to a credit meter of the EGM. The instructions further cause the processor to increment a first credit meter on the EGM by the amount of play credits identified in the response message. The instructions also cause the processor to conduct instances of game play of the electronic game on the display device, each instance of game play decrementing the first credit meter to enable play.

DETAILED DESCRIPTION

Figure 1:
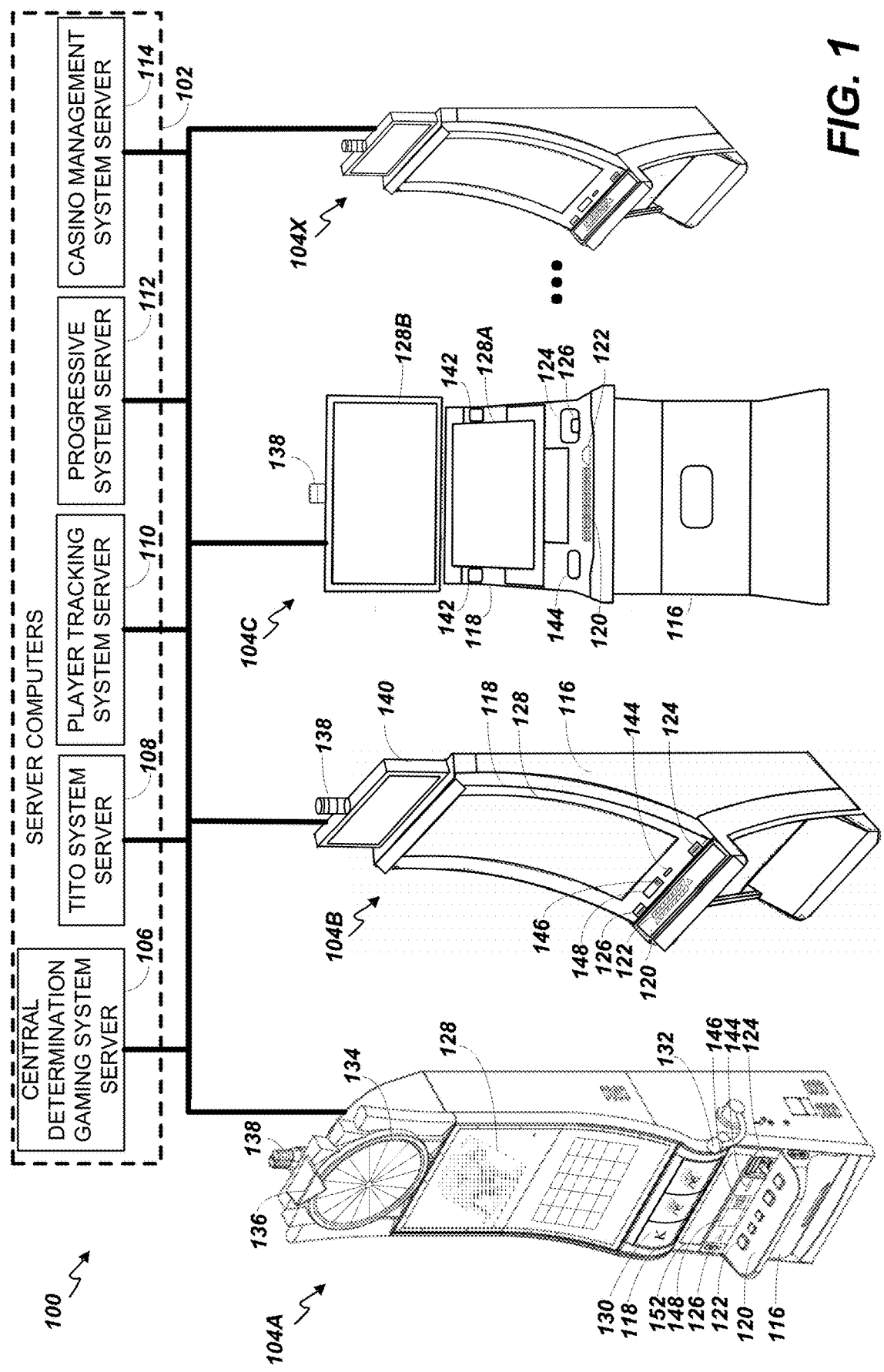
FIG. 1 is an exemplary diagram showing several EGMs networked with various gaming related servers.

In various embodiments, an electronic gaming system for playing a digital table game is provided herein. For example, in at least one embodiment, the system described herein tracks purchases of a player (e.g., purchases of beverages at a bar) using a point-of-sale (POS) device and award play credits for the table game (e.g., a virtual wheel spin game) based on the purchase transaction. The system may store the play credits in a memory in association with a player identifier corresponding to the player. The player then requests a play (e.g., a spin) at an EGM included in the system (e.g., a tabletop EGM at which multiple patrons may be seated during a social gathering, such as for dinner or drinks). The system may identify the player identifier corresponding to the player, verify that the player has sufficient play credits, and initiate the play in response to the verification. In some embodiments, the system may identify the player by detecting, at the EGM, a payment device (e.g., a payment card), a player loyalty card, or another token that may be associated with the player identifier stored in the memory (e.g., a radio frequency identification (RFID) tag embedded in a beverage glass). During the play, the system displays a graphical representation of the game (e.g., an animation of a spinning wheel, an animation of spinning slot reels) on the tabletop display of the EGM in view of all patrons seated at the table. The system determines a game outcome (e.g., using a random number generator (RNG)) and awards prizes to any vested players based on the result of that spin (e.g., displaying a notification of the prize and crediting the winning player(s), printing a coupon corresponding to the prize at the EGM, or the like).

The systems and methods described herein therefore embody a variety of technical aspects that are configured to achieve certain technical effects, such as, for example: (a) a data structure that includes a player identifier associated with a number of play credits and one or more of a payment account, a rewards account, information corresponding to a token (e.g., an RFID tag), and a weight of an item (e.g., a beverage glass) corresponding to the player identifier; (b) an EGM that can identify a player identifier based on one or more of a payment account, a rewards account, information corresponding to a token (e.g., an RFID tag), and a weight of an item (e.g., a beverage glass) corresponding to the player identifier; (c) an EGM that can award play credits based on transactions detected at a POS device; and (d) an EGM that can support multiplayer gameplay by providing an EGM including a wheel that may be used to simultaneously determine prizes to one or more of a plurality of players based on an RNG call.

Conventional EGM games typically do not include a community aspect to game play. Rather, the games are for just a single person to play. This new digital tabletop game and tabletop EGM provides a community aspect where more than one person can play and experience the excitement of the game in a social setting. For example, the system enables multiple individuals to play simultaneously by providing a shared interface (e.g., including a graphical representation of a wheel on the tabletop display) and allows multiple patrons to enter into game play for game rounds of the tabletop game. Each individual vested in a particular spin may have their own marker that identifies their own award position after a wheel spin (e.g., with perhaps multiple markers at various spots around the wheel), or a group may share a single marker that determines the award that all vested players receive based on the result of the wheel spin.

Conventional EGMs also may not include a social aspect of being able to play the EGM game in a social setting such as a bar or restaurant. Here, the EGM is configured to be suitable for a bar or restaurant setting, where purchases of beverages and food items can also provide a number of spins (e.g., individually credited to the purchaser or communally credited to the EGM for use by the seated group) that can be used for the tabletop game. Further, awards for the spins may be tailored to that same social setting, such as providing free food (e.g., a free appetizer), beverages (e.g., free drinks), or free spins for the tabletop game.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards. Additionally, or alternatively, one or more of gaming devices 104A-104X may be configured as a tabletop game, as shown below in FIG. 4.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
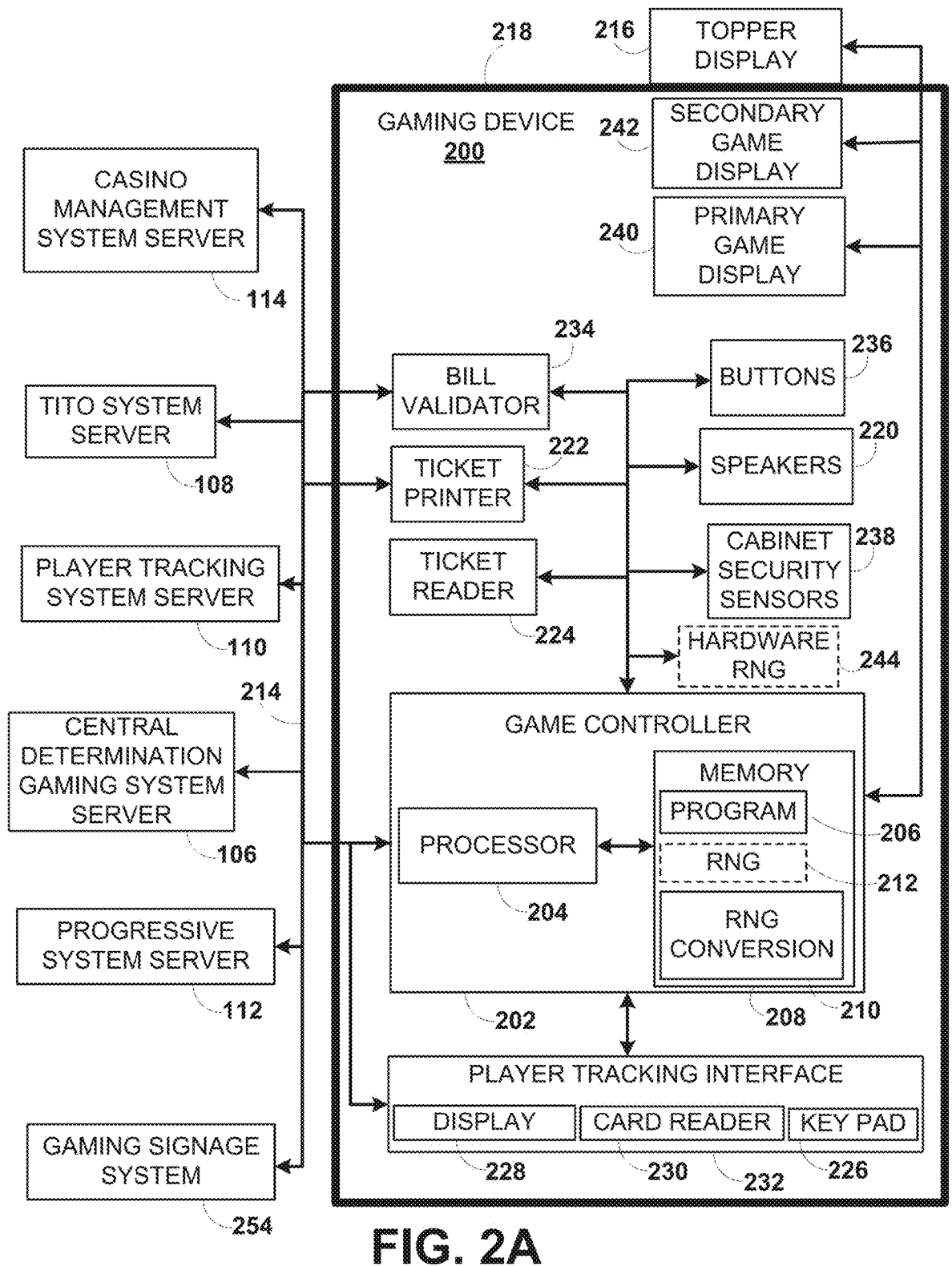
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Figure 4:
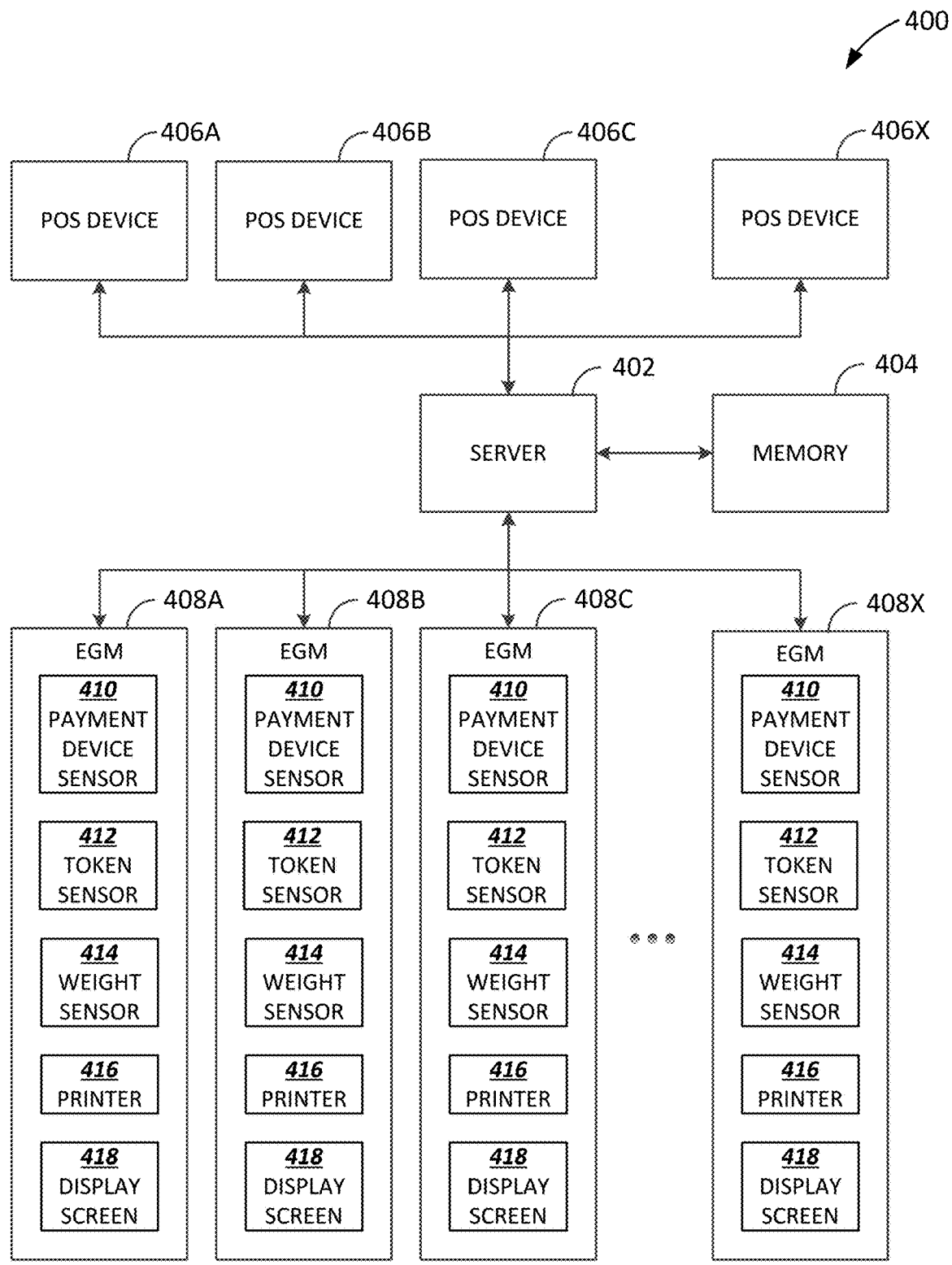
FIG. 4 is a block diagram of an exemplary slot table hybrid gaming system in accordance with various embodiments described herein.

Although gaming devices 104A-104X are shown in FIG. 1 as upright EGMs, the systems and methods described herein can be used on upright EGMs or table type EGMs as shown in FIG. 4.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

In an example embodiment, a tabletop EGM (not shown in FIG. 1) is provided which may be similar to the gaming devices 104. The tabletop EGM may include a horizontal display device that can be used by patrons as a conventional table surface as well as for providing player input (e.g., touchscreen surface, mechanical buttons, or the like) and display output (e.g., virtual wheel, virtual slot reels) for a tabletop game. The tabletop EGM may support participation for multiple players during game play (e.g., as patrons socially meet around the tabletop EGM). Example tabletop EGMs and features are described in greater detail below.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
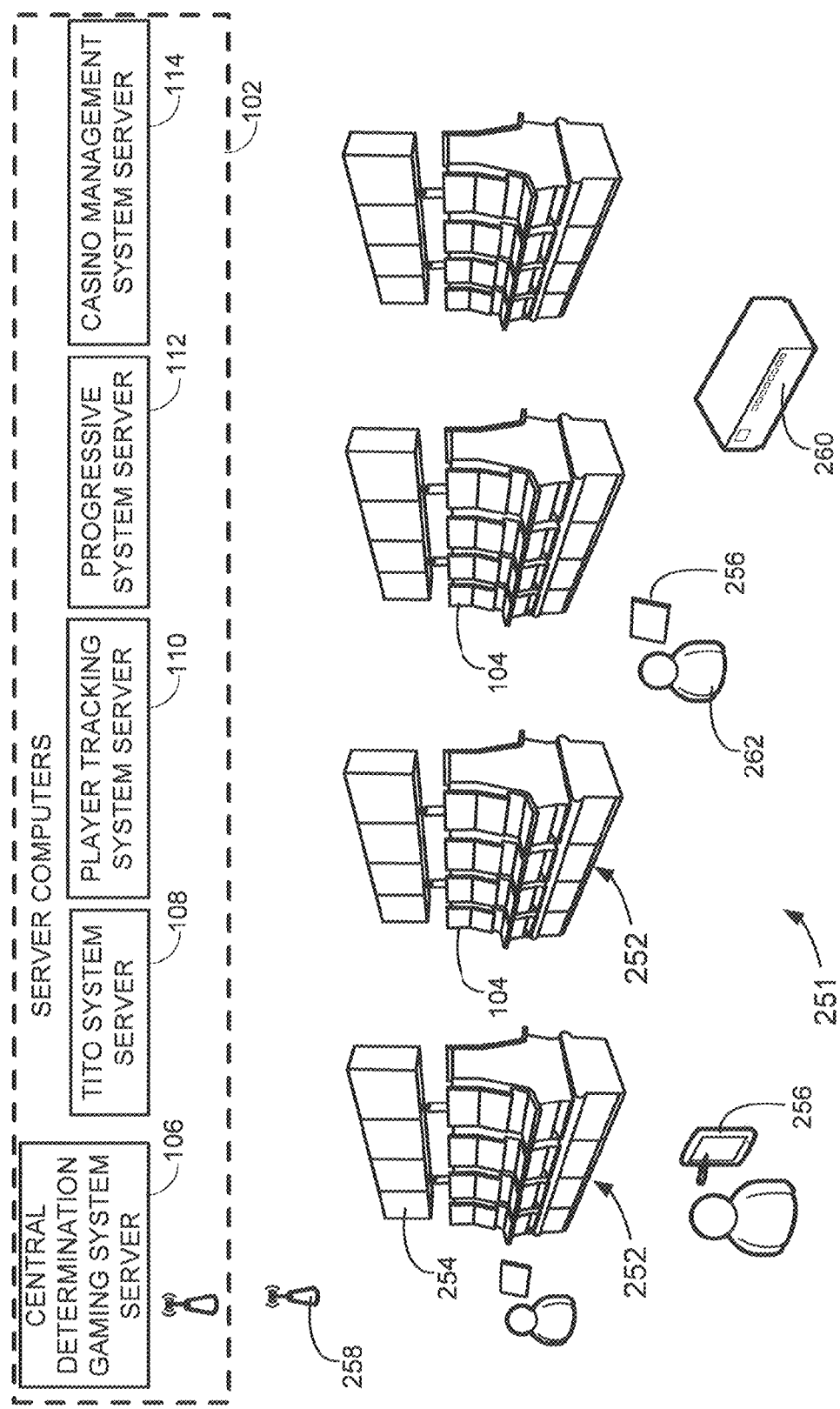
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
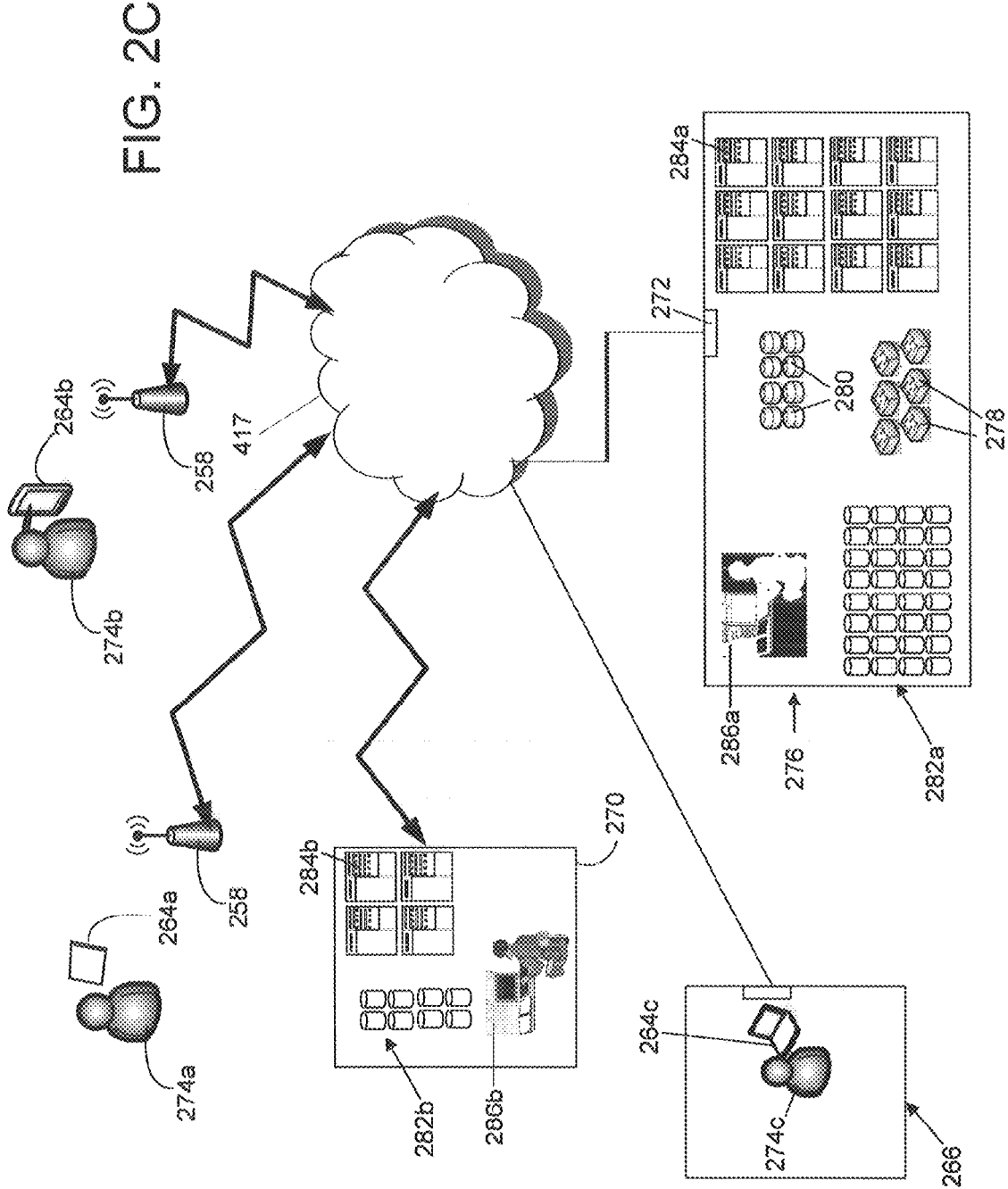
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
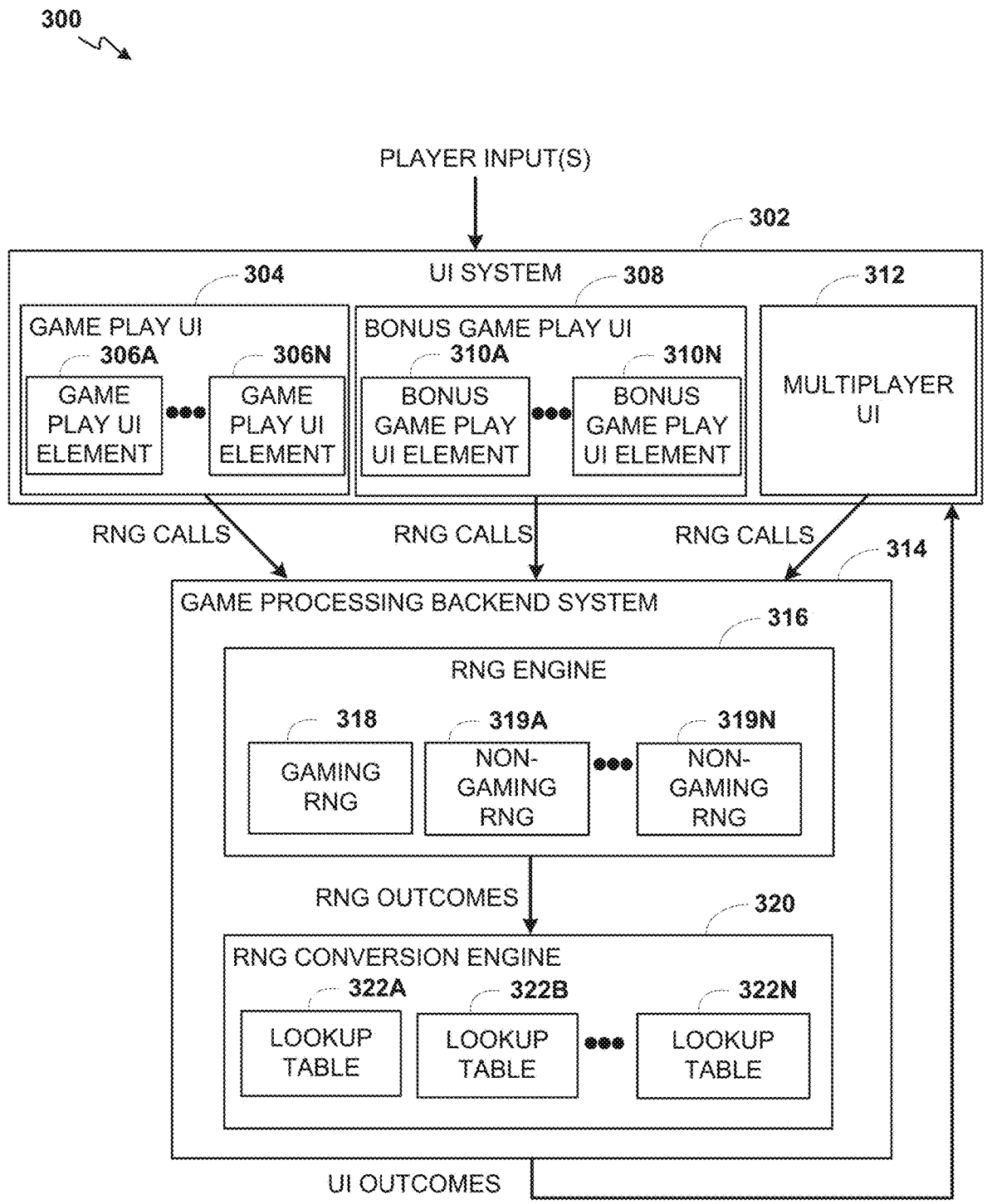
FIG. 3 illustrates, in block diagram form, an embodiment of a game processing architecture algorithm that implements a game processing pipeline for the play of a game in accordance with various embodiments described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

FIG. 4 is a block diagram of an exemplary table gaming system (or just "gaming system") 400 in accordance with various embodiments described herein. In the example embodiment, gaming system 400 includes a server system (or just "server") 402, a memory 404, POS devices 406A-406X, and EGMs 408A-408X that provide a shared gaming experience to patrons in a social setting, such as at a bar, restaurant, or lounge venue. The server system 402 may be similar to the server systems 102 in FIG. 1 and the EGMs 408 may be similar to the EGMs 104 in FIG. 1 or the gaming device 200 in FIG. 2. In the example embodiment, the EGMs 408 are provided in a tabletop configuration, such as the tabletop EGM 600 shown in FIG. 6. Each EGM 408 includes a horizontal display device that provides game output for a digital tabletop game provided by the EGM 408. Patrons seated or standing around the EGM 408 can elect to participate in the game, for example, using game credits purchased or otherwise acquired through payment transactions on the POS devices 406. The server system 402 is configured to track game credits for transactions at the POS devices 406 and provide those game credits to the EGMs 408 as patrons play the tabletop game.

For example, a group of friends ("patrons" of the venue) may be having drinks at the venue and may gather around the EGM 408A (e.g., for social conversation, dining, spectating sporting events on a nearby display, or the like). The venue may provide game credits for the tabletop game as part of, or in response to, a food or beverage purchase by the patrons at the EGM 408A. For example, drink purchases may include a predetermined number of game credits with every purchase, based on a total purchase price, or the like. As the patrons perform food or beverage purchases, a service staff member (e.g., a waiter) enters purchase transaction details through one of the POS devices 406 (e.g., cash payments, payment card payments, credit transfers, or the like). The server 402 receives such purchase transactions from the POS devices 406 and provides game credits (e.g., individually to a particular purchaser, or communally to the particular EGM 408A) based on the purchase transaction. These game credits may then be used by the associated purchaser or the EGM 408A for tabletop game play as the patrons enjoy their experiences around the EGM 408A.

More specifically, in the example embodiment, POS devices 406A-406X are payment terminals or other devices used to facilitate purchases or payment transactions at the venue (e.g., food and beverage purchases). During a payment transaction, the server 402 receives transaction data from the POS device 406 and determines a number of play credits to provide based on the transaction data. For example, the transaction data may include a total transaction amount and the server 402 may be configured to provide play credits based on that transaction amount (e.g., as a percentage of the total transaction amount, a pre-determined number of credits by tier based on the total transaction amount). The transaction data may include item-level purchase information (e.g., line items, product codes that identifies what was purchased) and the server 402 may be configured to provide a pre-determined amount of play credits based on the particular item(s) or service(s) purchased (e.g., 2 free spins with a beer purchase, 5 free spins with a top-shelf mixed drink purchase, 10 free spins with a bottle of wine or champagne purchase, and so forth). In some embodiments, POS devices 406A-406X may determine the play credits to provide to the purchaser. The amount of play credits provided with the transaction may additionally or alternatively be determined or adjusted based on factors such as, for example, the time or date of the transaction (e.g., different levels of credit during particular events, during happy hour periods, or such), the location of the transaction (e.g., different levels of credit at particular venues), or a loyalty level of the purchaser (e.g., normal credits for silver members or anonymous purchasers, double credits for gold members, triple credits for platinum members).

In the example embodiment, the server 402 adds the play credits to an account associated with the purchaser. In some situations, the purchaser may be a known patron (e.g., a member of a loyalty program, with the player having provided their loyalty account as a part of the transaction) having an existing unique player ID and the server 402 may credit a player account for that player with the play credits (e.g., a house account of the player, a digital wallet account of the player, an online account of the player). As such, the player may register the play credits on the EGM 408A by providing their loyalty card at the EGM 408A. In some situations, the server 402 may create a transient account with the transaction and associate that transient account with identifiable information of the purchaser (e.g., a primary account number (PAN) of a payment card used during the transaction, a state or federal ID scanned during the transaction). As such, the player may register the play credits on the EGM 408A by providing the payment card or ID to the EGM 408A (e.g., via a payment device sensor 410). In some embodiments, the server 402 or the POS device 406 may print a redeemable ticket that embodies the play credits (e.g., a TITO ticket, a reward ticket), and the service staff member may provide the ticket when delivering the order. As such, the patron may insert the ticket into a ticket reader of the EGM 408A to register the play credits. In some embodiments, the service staff member may associate the purchase transaction with the particular EGM 408A and the EGM 408A may print the ticket after the transaction is performed (e.g., on printer 416) or may directly credit the EGM 408A with the play credits (e.g., with a communal account on the EGM 408A, or to a particular player position of the purchaser identified by the service staff member).

In some embodiments, the play credits may be provided to the EGM 408A via a token device. For example, the venue may use special drink glasses, plates, or other dishware configured with near-field communications (NFC) technology (e.g., RFID tags) to deliver play credits to EGMs 408 for these drink or food purchases. A drink glass (not shown), in one example, may be configured with an RFID tag that provides a unique ID for that glass. When an eligible purchase is made, the drink glass used for the order may be identified to the server 402 (e.g., during order preparation) and the server 402 may credit the play credits to the unique ID of the glass. When the glass is delivered to the EGM 408A, the glass is placed on or near an RFID sensor (e.g., token sensor 412 installed beneath a tabletop surface of the EGM 408A). Upon reading the unique ID of the glass, the EGM 408A transmits a credit transfer request to the server 402 and the server 402 responds with an identification of the play credits to apply to the EGM 408A, thereby adding the play credits to the EGM 408A and reducing the play credits from the unique ID of the glass. As such, dishware may be used to transfer play credits to the EGM 408A as part of a purchase transaction. Similarly, in some embodiments, RFID tokens (e.g., customized chips with unique RFID tags) may be used to transfer play credits in similar fashion. In some embodiments, the system 400 may use groups of particular glasses, dishes, or the like for particular play credit values. For example, RFID beer glasses may be pre-configured with 2 free plays, RFID wine glasses may be pre-configured with 3 free plays, RFID appetizer plates may be pre-configured with 5 free plays, and the like. As such, when a particular type of dish is detected (e.g., via token sensor 414), the system 400 is configured to apply the pre-configured play credits of that dish type.

In some embodiments, play credits may be established at the EGM 408A similar to the gaming devices 104, 200 of FIGS. 1 and 2. For example, the players may establish play credits at the EGM 408 by providing a redeemable ticket with a cash value via a ticket reader, such as ticket reader 224 (shown in FIG. 2), or by providing cash via a bill validator, such as bill validator 124. The EGMs 408 may include a single ticket reader or bill validator for the EGM 408 (e.g., providing communal play credits for the EGM 408) or may include individual ticket readers or bill validators for each individual player position at the EGM 408 (e.g., providing position-based play credits). In some embodiments, the players may wirelessly connect with the EGM 408A and establish play credits to that particular EGM 408A. For example, the EGM 408A may wirelessly broadcast (e.g., via Bluetooth®), using a wireless beacon, a unique machine ID (UID) of the EGM 408A that is received and read by a mobile device of the player (e.g., EUD 264 shown in FIG. 2C) running a player app. The mobile device may wirelessly connect with and transmit the UID of the EGM 408A to the server 402, thereby identifying the UID of the EGM 408A to the server 402, along with the identity of the player (e.g., via user credentials in the player app). The player may then authorize transfers to or from the EGM 408A (e.g., from a player account, loyalty account, digital wallet, stored rewards, or the like), such as transferring play credits to the EGM 408A, redeeming rewards for play on the EGM 408A, redeeming rewards for food or drinks, receiving balances from the EGM 408A, and so forth, each of which may be facilitated by the server 402 in communication with the EGM 408A. In some embodiments, the player app may allow the player to select a player position at the EGM 408A (e.g., designated by selecting from a graphical representation of the player positions of the EGM 408A). In some embodiments, the EGM 408A may include separate NFC beacons for each particular player position at the EGM 408A and the EGM 408A may automatically determine and establish the position of the player at the EGM 408A based on which beacon the mobile device of the player attaches to.

In some embodiments, to EGMs 408A-408X may include weight sensors 414 that are configured to transfer play credits in response to sensing certain weighted items. For example, during order preparation, a preparer may use the POS device 406A to weigh a qualifying item before it is delivered to the EGM 408A. The server 102 may, for example, store the weight of a qualifying item (or an item on a qualifying purchase), the play credits being provided with that item or purchase, and possibly the UID of the EGM 408A associated with the purchase. When the weighed item is delivered to the EGM 408A, the waiter or the purchaser may place the weighed item on the weight sensor 414. Upon sensing an item being placed on the weight sensor 414, the EGM 408A may sense the weight of the item and transmit that weight to the server 402 in a weighed item authorization message. The server 402 looks up the weight of the item, and possibly the UID of the requesting EGM 408A, to determine whether there is a pending credit record for an item of approximately that weight (e.g., within a predetermined threshold, such as 1%, 0.2 kg, 0.1 lbs, or the like). If the server 402 locates a valid and unredeemed credit record, the server 402 determines the play credits associated with that record and transfers the play credits to the EGM 408A.

It should be understood that any suitable number of POS devices 406A-406X and EGMs 408A-408X may be included. The POS devices 406A-406X and EGMs 408A-408X are communicatively coupled to the server 402, such as via a local area network (LAN), a wireless network, or the like. For example, POS devices 406A-406X and/or EGMs 408A-408X may communicate with the server 402 via any suitable wireless communication standard, such as Bluetooth®, WiFi, any near field communications (NFC) standard, and the like. POS devices 406A-406X and/or EGMs 408A-408X may communicate with server 402 via any local area network (LAN), any wide area network (WAN), and/or the Internet. In some example embodiments, server 402, memory 404, and one or more EGMs 408A-408X may be integrated into a single unit (e.g., contained within a single enclosure).

Figure 5A:
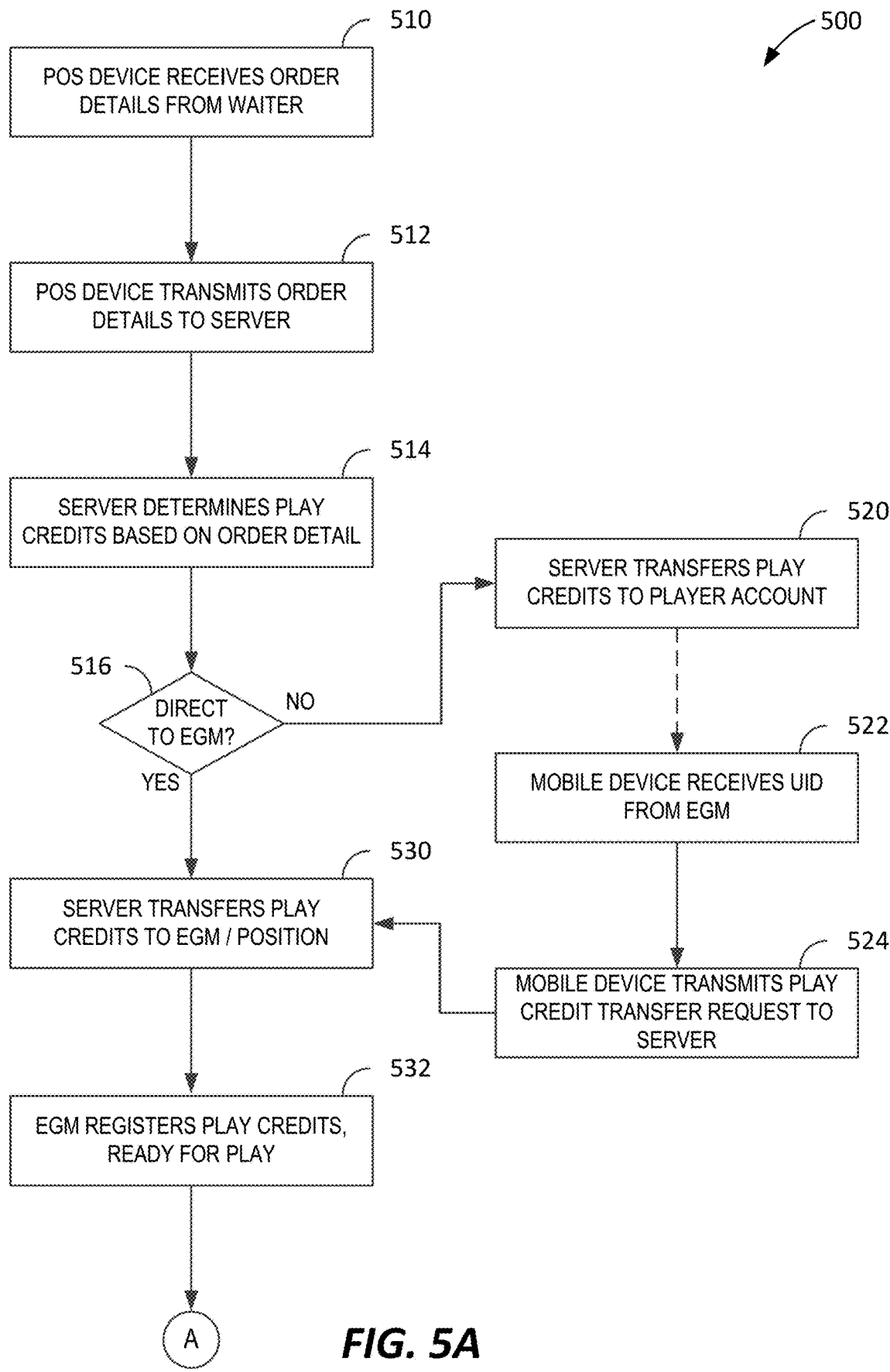
FIG. 5A illustrates example embodiments for a method of establishing play credits on the EGM in conjunction with a purchase order (e.g., purchase of food or beverage) made using the POS device in the gaming system shown in FIG. 4.

FIG. 5A illustrates example embodiments for a method 500 of establishing play credits on the EGM 408A in conjunction with a purchase order (e.g., purchase of food or beverage) made using the POS device 406A in the gaming system 400 shown in FIG. 4. In the example embodiment, a service staff member (e.g., a waiter) receives an order from a patron seated at the EGM 408A (e.g., a food or drink order) and enters order details for the purchase order at the POS device 406A. In some embodiments, the order detail may be received by the POS device 406A (or server 402) automatically (e.g., without waiter input), such as from an online order entered by the purchaser using their mobile device app and entering the order into an online order entry system (not shown). In some embodiments, the POS device 406A may perform a payment transaction for the order (e.g., a payment card transaction, a cash transaction, a credit transaction, or the like). At operation 510, the POS device 406A receives those order details. The POS device 406A may be, for example, an order entry terminal configured to allow the waiter to enter order details such as menu items ordered by the patron, a seating location of the patron (e.g., uniquely identifying the EGM 408A), or patron information (e.g., loyalty ID of the patron(s), payment card information for the order, or the like). At operation 512, the POS device 406A transmits order details to the server 402. In the example embodiment, the order details include menu item identifiers for one or more items that, in addition to providing an underlying food or beverage item or service, also privilege the purchaser with play credits with the purchase of that item. For example, the venue may be offering a free play credit (e.g., a free spin at the EGMs 408) with the purchase of every beer or glass of wine. As such, the order details may provide a menu item identifier for the particular beer or wine ordered by the patron, and the system 400 is configured to facilitate the transfer of that play credit for use on the EGMs 408. In some embodiments, the order detail may identify the EGM 408A (e.g., based on a unique UID of the EGM 408A determined based on a seating location of the order), and may include position information identifying particular menu items by various positions at the EGM 408A (e.g., a beer ordered by a patron at position one, a glass of wine ordered by another patron at position two, and so forth). In some embodiments, the order detail may identify one or more individual patrons (e.g., by patron ID or the like), and may also associate individual patrons with particular positions at the EGM 408A.

At operation 514, the server 402 receives the order details from the POS device 406A and determines a number of play credits to provide for the order based on the order detail. For example, the order may have included item identifiers for the two beers and the glass of wine, and the server 402 may be configured to provide a play credit for each of those types of item identifiers (e.g., based on a pre-configured purchase list associating item identifiers with credit values for each purchase of that item identifier). In some embodiments, the server 402 may be configured to provide play credits based on a percentage of a purchase price (e.g., a percentage of charged value of eligible items or services, a percentage of total charged value, or such). In some embodiments, the server 402 may be configured with one or more tiers of purchased value and associated play credits for each tier (e.g., two free plays with a purchase of at least $15.00, three free plays for purchase of at least $25.00, and so forth).

In some embodiments, the system 400 is configured to provide the play credits direct to the EGM 408 in preparation for game play (whether communally to the entire EGM 408A or individually to particular positions at the EGM 408A), where in other embodiments, the system 400 is configured to transfer the play credits to individual players and allow those individual players to apply the play credits to the EGM 408A when they wish to enter into game play. At test 516, if the system 400 is configured for providing play credit direct to the EGMs 408 (or if the transaction is otherwise configured for direct to EGM payment, such as through waiter selection or based on a lack of player identification with the order), the server 402 transfers the determined play credits to the EGM 408A, and optionally to a particular position at that EGM 408A at operation 530. As such, at operation 532, the EGM 408A registers the play credits for use, and the EGM 408A is ready for game play.

If, at test 516, the system is not configured for providing play credit direct to the EGMs 408 (or if the transaction is configured to provide play credit to individuals, such as when player identification is available for the purchaser or based on waiter selection), the server 402 transfers the play credits to the individual purchaser(s) at operation 520. In the example embodiment, the order details for the transaction include a player ID for one or more loyalty members of a purchaser, and the server 402 identifies a player account associated with the patron (e.g., an account maintained as part of a loyalty program) and credits that player account with the determined play credits. In some embodiments, for example for "anonymous" patrons without an identified player account, the server 402 may create a temporary account (e.g., a transient account) using other player identifying data provided in the order data (e.g., a payment account number of a payment card used with the order, a room card or photo ID provided in the order details), and may transfer the play credits to that transient account. The player may later use that same payment card at the EGM 408A to identify themselves and access the play credits from the transient account. Such indirect transfer sets up the play credits for later transfer to the EGM 408. When the player is at the EGM 408A, the player may use their mobile device to establish their presence at the particular EGM 408A (e.g., via wirelessly detecting the UID of the EGM 408A) at operation 522. At operation 524, the mobile device transmits a play credit transfer request message to the server 402 indicating an amount of play credits to transfer from the player account of the player and the UID of the EGM 408A. In other embodiments, the player may present their payment card, room card, their loyalty card, government ID, or other personal card at the EGM 408A, which may be transmitted to the server 402 for identification of the account associated with that individual. At operation 530, the server 402 similarly transfers the play credits to the EGM 408A and, thus, the EGM 408A is prepared for game play at operation 532.

Figure 5B:
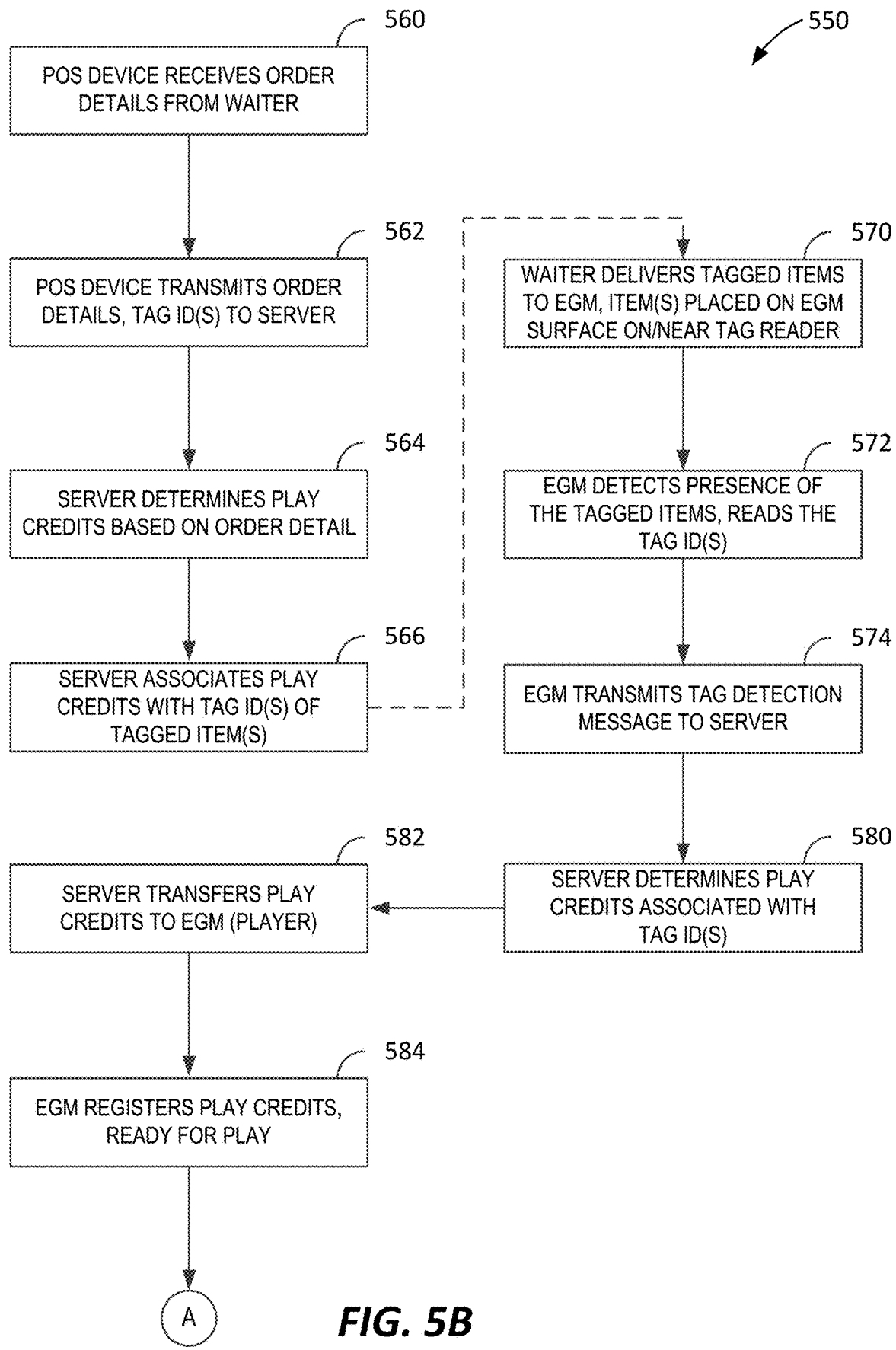
FIG. 5B illustrates example embodiments for another method of establishing play credits on the EGM in conjunction with a purchase order using the POS device in the gaming system shown in FIG. 4

FIG. 5B illustrates example embodiments for another method 550 of establishing play credits on the EGM 408A in conjunction with a purchase order using the POS device 406A in the gaming system 400 shown in FIG. 4. In this method 500, play credits associated with the order are delivered to the EGM 408A using RFID tags attached to dishware or other objects ("tagged object(s)" or "tagged items") delivered to the purchaser during fulfillment of the order. For example, glasses or plates may be constructed with passive RFID tags, or a tag device (e.g., passive or active) may be transferred to the purchaser upon placement of the order or upon acceptance of a completed order. The play credits provided by the particular purchase are associated with the tagged item(s) during the order process, and when the tagged items are delivered to the EGM 408A, the EGM 408A senses the tagged items and establishes the play credits.

More specifically, in the example method 550 shown here, the POS device 406A receives order details (e.g., from the waiter, from an online ordering system, or the like) at operation 560. These order details may be similar to the order details described above in relation to operation 510 of FIG. 5A. Additionally, in the example embodiment, the order details also include one or more tag IDs that are to be associated with the order. For example, during order entry or order preparation, the waiter or an order preparer (e.g., a cook, a bartender) may associate tag IDs of one or more dishes (e.g., tagged beverage glass, tagged appetizer plate, or the like) or a dedicated tagged device (e.g., tagged chip, tagged pager device, tagged rewards card, or the like) with the order, thereby storing an association between an order number of the order and the tagged device(s) (e.g., the tagged IDs). At operation 562, the POS device 406A transmits the order details and tag IDs to the server 402 and, at operation 564, the server 402 determines play credits based on the received order details. Operations 562 and 564 may be similar to operations 512 and 514 shown in FIG. 5A.

At operation 566, in the example embodiment, the server 402 associates the determined play credits with one or more of the tag IDs identified in the order details. For example, the server 402 may store an entry in an orders database (not separately shown) indicating a particular tag ID of a dish being used to fulfil the order (e.g., a tagged drink glass used to hold an ordered drink) and a number of play credits being provided with the purchase (e.g., one free play credit for ordering that drink, a number of free play credits associated with the entire order, or the like). In some situations, the order may include multiple individually-qualifying order items and, as such, the server 402 may be configured to associate particular play credits with each qualifying item, where each qualifying item may include a distinct tagged item (e.g., one free play credit for a beer served in a tagged mug for a first patron, two free play credits for a top shelf mixed drink served in a tagged glass, five free play credits for an entree served on a tagged dinner plate). As such, play credits may be awarded to particular individuals at the EGM 408A through their own tagged items. Once the server 402 has stored these associations, the system 400 is prepared to deliver play credits to EGMs 408 via the tagged item(s).

Continuing this example, the waiter delivers the tagged items to the EGM 408A at operation 570. The EGM 408A includes one or more RFID tag readers (e.g., active readers embedded with a table top surface of the EGM 408A or otherwise contained within the EGM 408A). At operation 572, the tag reader of the EGM 408A reads the tag ID(s) from the tagged item(s). In one example embodiment, the EGM 408A includes a single tag reader for receipt of "communal credits," or credits registered to the EGM 408A in a single credit balance and not necessarily to any particular individual position or player at the EGM 408A. For example, the table surface of the EGM 408A may include surface markings indicating where tagged items can be placed for optimal tag recognition by the reader, and the waiter or the players may deliver or otherwise place the tagged item(s) at that location to trigger the reader to recognize the tagged items. In another example embodiment, the EGM 408A may define multiple independent positions at the EGM 408A (e.g., maintaining separate position credit balances for each position). In such embodiments, the EGM 408A may include a separate reader at each position configured to read tags and add play credits to that position's balance on the EGM 408A.

At operation 574, the EGM 408A transmits one or more tag detection messages to the server 402. In the example embodiment, the tag detection messages include the UID of the EGM 408A and the tag ID(s) detected by the tag reader. At operation 580, the server 402 looks up the play credits associated with each provided tag ID and, at operation 582, transfers the play credits to the EGM 408A (e.g., to the communal credit meter of the EGM 408A or to a particular position meter of one of the positions of the EGM 408A). At operation 584, the EGM 408A receives the play credits transfer and registers the play credits to the particular meter, thereby making the additional play credits available for game play on the EGM 408A.

In some embodiments, the system 400 may associate particular tag IDs with particular positions at the EGM 408A (e.g., at operation 566, based on order information identifying which player/position ordered particular items). As such, any one of the tag readers may be configured to read the tag IDs and the server 402 may transfer the associated play credits with the particular position (e.g., at operation 582, and regardless of whether a communal tag reader or a particular position tag reader is used to read the tags).

In some embodiments, the system 400 may use a printed ticket in lieu of the tagged item. For example, the POS device 406A may print out a ticket (e.g., a TITO ticket) that can be redeemed at the EGM 408A for credit. The ticket may include an optical image such as a QR code, bar code, or the like, and the EGM 408A may include a scanner device (e.g., ticket reader 224) that is configured to scan and redeem tickets (e.g., after lookup and authorization from the server 402). In other embodiments, the ticket may include a code (e.g., a unique ticket ID) that the player enters into the EGM 408A to redeem the ticket. The EGM 408A sends the code to the server for redemption. The server 402 may transfer the play credits to the redeeming EGM 408A after successful authorization.

Figure 6:
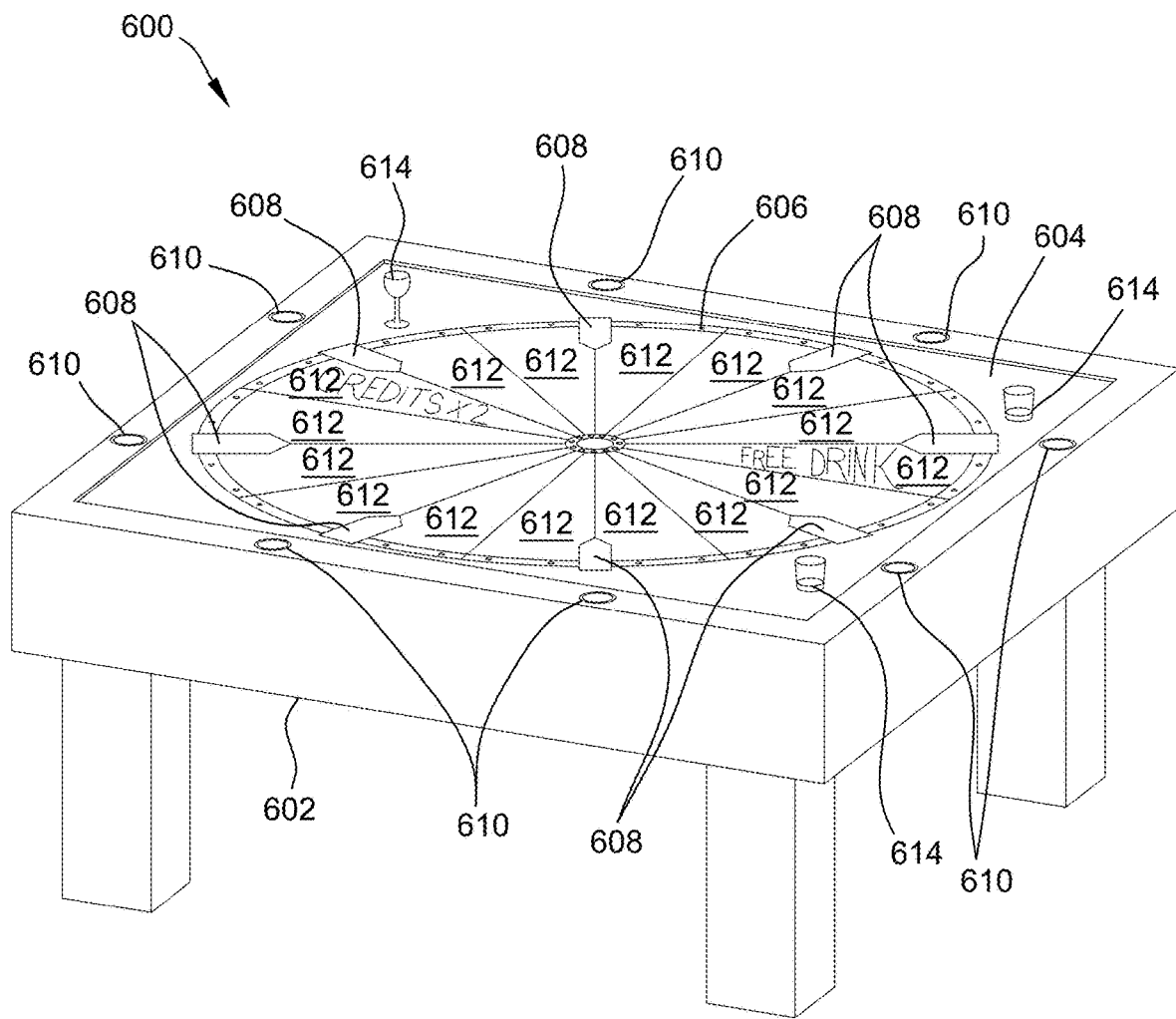
FIG. 6 is a perspective view of an exemplary tabletop EGM for use with gaming system shown in FIG. 4.
Figure 7:
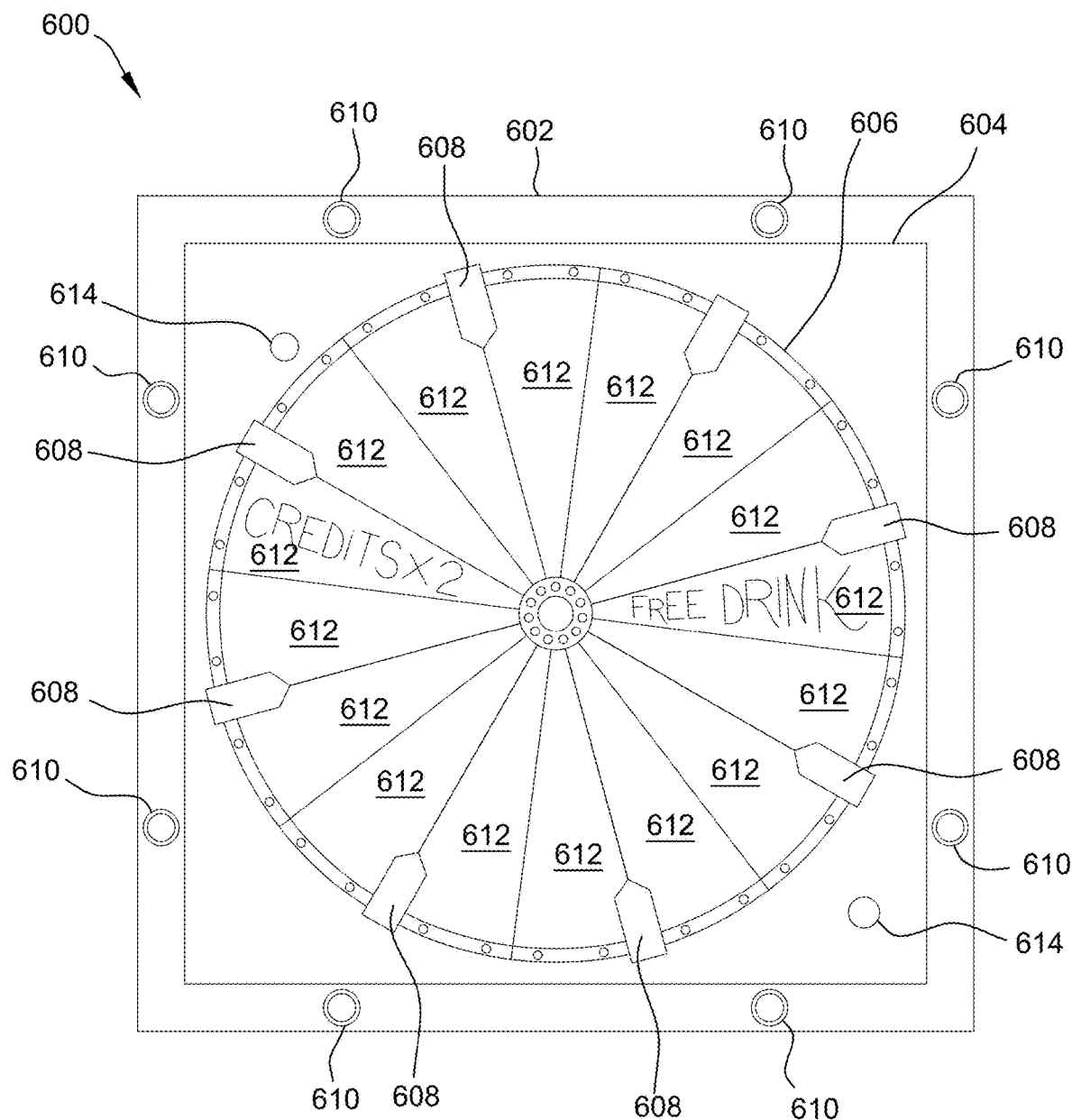
FIG. 7 is a plan view of the EGM shown in FIG. 6.
Figure 8:
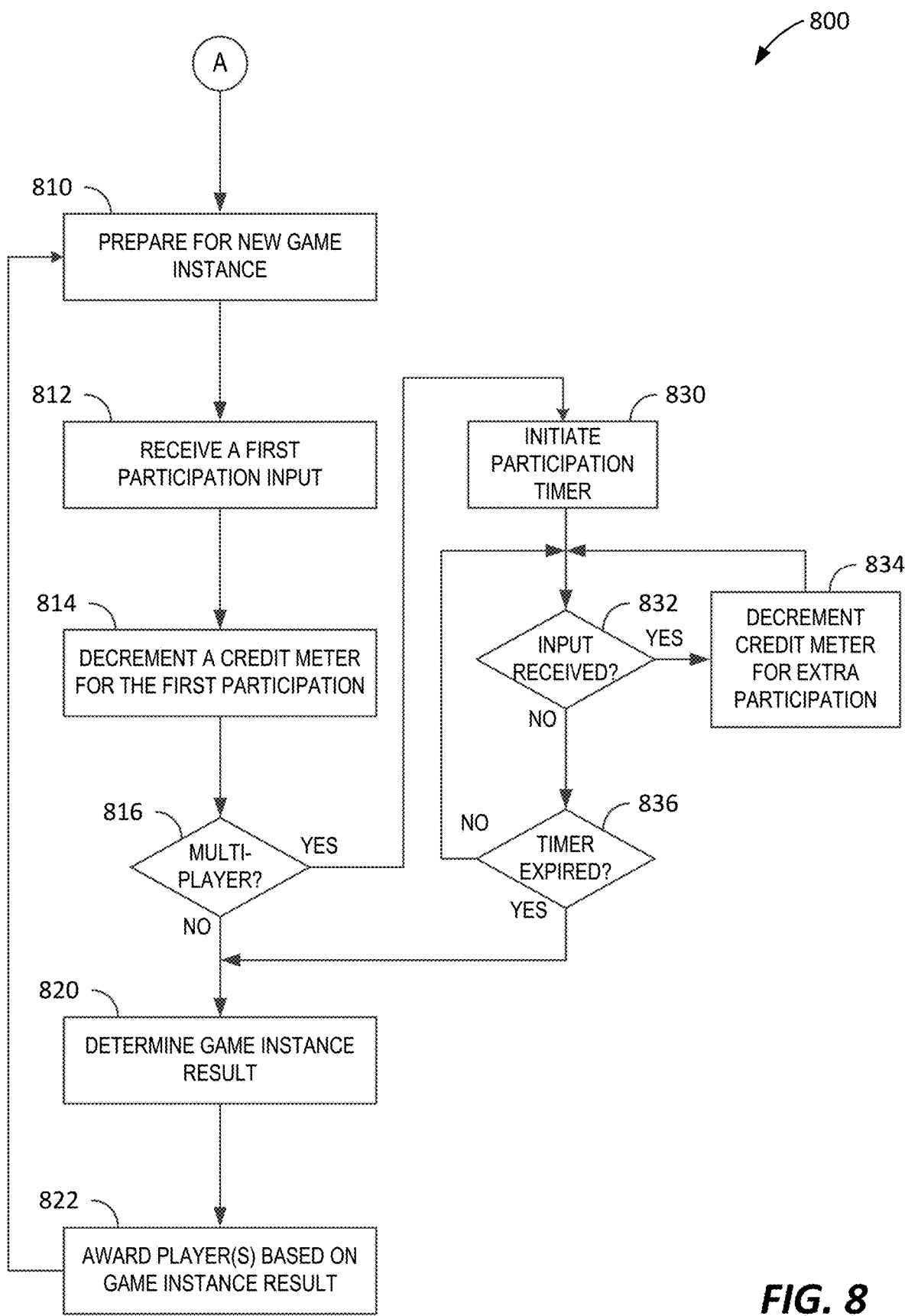
FIG. 8 is flowchart illustrating an exemplary method for providing an electronic game implemented using gaming system shown in FIG. 4 on the EGM shown in FIGS. 6 and 7

Once the play credits for the order are credited to the EGM 408A, the players at the EGM 408A can engage in game play. FIGS. 6-8 illustrate example embodiments of game play and use of play credits in greater detail.

FIG. 6 is a perspective view of an exemplary tabletop EGM 600 for use with gaming system 400 shown in FIG. 4. For example, EGM 600 may generally function as described with respect to EGMs 408A-408X, and may include any of the hardware components of gaming devices 104, 200 shown and described above with respect to FIGS. 1 and 2A. FIG. 7 is a plan view of the EGM 600. Referring now to FIGS. 6 and 7, the EGM 600 includes a game table 602 and a play surface 604 disposed on a top surface of game table 602. While the play surface 604 is positioned horizontally upon game table 602 in FIGS. 6 and 7, in other embodiments, play surface 604 may have another orientation (e.g., a vertical orientation, a slanted orientation) that enables the EGM 600 to perform any of the functions described herein. In the example embodiment, the EGM 600 includes a display device (not separately shown in FIGS. 6 and 7) configured to display digital graphics on the play surface 604. In other words, some or all of the play surface 604 may be a surface of the display device.

In the example game shown here, the display device displays a wheel 606 that is spun during game play, stopping to mark player outcomes relative to one or more player position markers 608, each of which are stationary during game play. In other embodiments, the wheel 606 may be a mechanical or electromechanical wheel disposed on game surface 604. The EGM 600 provides positions for eight individual players, represented here by the eight player position markers 608. In other embodiments, the EGM 600 may provide any number of individual positions, or may provide a single position marker for all of the players (e.g., for communal game play). In some embodiments, the player position markers 608 are digitally displayed on the display device, where in other embodiments, the player position markers 608 are physical objects configured at pre-determined positions on the play surface 604. While not separately depicted here, the EGM 600 may provide separate credit meters for each individual player position or may provide a single credit meter (e.g., a "communal credit meter") for use by any of the players at the EGM 600, and the EGM 600 may display credit meter balance(s) on the play surface 604. In the example embodiment, each player position also includes a push button 610 which the player may use to initiate game play. In some embodiments, the play surface 604 may include a touchscreen device (not separately shown) covering some or all of the play surface 604 that allows the players to provide player inputs (e.g., touch gestures) during use of the EGM 600. For example, the EGM 600 may digitally display the player position markers 608 and may allow the players to initiate game play or enter into a round of play by pressing their own player position marker 608.

In some embodiments, the EGM 600 may include one or more tag readers (e.g., active reader device, not separately shown) configured to sense and read RFID tags of tagged items placed on or near the EGM 600. For example, the EGM 600 may include tag readers beneath the play surface 604 in each corner, thereby allowing the EGM 600 to detect tagged items set on the play surface 604, such as the drink glasses 614 shown in FIG. 6. In some embodiments, the tag readers may be enclosed within the frame of the EGM 600 (e.g., near or in lieu of push buttons 610). In some embodiments, each player position may include an associated tag reader. As such, when tagged items are delivered to the EGM 600, tag readers may be used by the EGM 600 to detect those tagged items and deliver play credits to the credit meters provided by the EGM 600 (e.g., as shown and described above with respect to FIG. 5B).

In the example embodiment, the EGM 600 provides a wheel-based game. The wheel 606 includes a plurality of sectors 612, some of which may correspond to a specific prize available to be won during game play. In the example shown here, some sectors 612 provide a free drink or an award of play credits, where other sectors 612 provide no award. In some embodiments, the EGM 600 allows multiple players to simultaneously play in an instance of game play. For example, presume four friends are sitting around EGM 600 and have ordered qualifying food or beverages that provided play credits on the EGM 600 (e.g., as described in FIGS. 5A and 5B). In embodiments where the EGM 600 allows multiple players to participate in an instance of game play, any one or more of the players may enter into an upcoming instance of play by providing a participation input (e.g., pressing their push button 610 or player position marker 608). Upon detecting the first participation input, the EGM 600 may initiate and display a participation timer (e.g., 3 seconds, 5 seconds, 10 seconds), thereby allowing other players to consider participating in this instance of play before the timer runs out. Any players providing participation input for that instance of play causes their player position to become vested in the game instance and decreasing a credit meter of the EGM 600 for each participating player (e.g., decrementing individual credit meters for the participating player positions or decrementing the communal credit meter for the EGM 600). Once the timer expires, the EGM 600 ceases accepting new participation inputs and performs the instance of game play with the vested players participating in the outcome.

In some embodiments, the EGM 600 may provide the wheel game with one player at a time (e.g., one player per game instance). For example, the EGM 600 may immediately initiate an instance of the game whenever any one of the players presses their spin button. In such an embodiment, the EGM 600 identifies which player (e.g., which player position) initiates game play based on the button pressed, decrements play credits from the associated credit meter of that player (or from a communal game meter), and spins the wheel to determine a game result just based on the player position marker 608 of that player. As such, the outcome is evaluated for only the one participating player.

In some embodiments, the EGM 600 may provide the wheel game communally, with only one outcome for each spin. For example, the wheel 606 may include only one fixed marker similar to the player position markers 608, but a single marker used to determine one outcome from each spin. In some such embodiments, the EGM 600 may maintain a communal credit meter for the EGM 600 and may allow any player to initiate a game instance, providing any game awards back to the communal credit meter or otherwise back to the EGM 600 generically (e.g., not specifically to any particular player). In other embodiments, the EGM 600 may maintain player credit meters for each particular player position and players may individually decide whether to participate in a particular instance of game play (e.g., as described above with regard to vesting during the participation timer countdown), but the EGM 600 may only provide a single marker and a single outcome from each game instance. In such an embodiment, when an award is generated, all of the vested players win the award. For example, if three players participate in a particular game instance, the EGM 600 may reduce play credits for each of the three participations, either individually from each of the participating player's credit meters or collectively from a communal credit meter. If an award is generated, such as a free drink, then all three participating players win a free drink individually, or three drinks are awarded to the EGM 600 communally.

During a game instance, the EGM 600 performs an RNG call (e.g. using RNG engine 316 and RNG conversion engine 320 of game processing backend system 314, shown in FIG. 3) that is used to provide an outcome and associated game graphics that is presented by the EGM 600. For example, the EGM 600 may use the output of the RNG call to determine a final display position of the wheel 606 (e.g., using a lookup table 322 stored in memory 404). Once EGM 600 has determined the final position of wheel 606, EGM 600 may rotate wheel 606 accordingly (e.g., as an animation of a spin). A player corresponding to one or more of the vested player position markers 608 may be awarded a prize that corresponds to the sector 612 that is aligned with the corresponding player position. In some embodiments, the EGM 600 may include a ticket printer (e.g., ticket printer 222), and some awards may cause a voucher to be printed for the given award (e.g., free game plays on other EGMs 104 or table games, free food or beverage coupons).

In other embodiments, the EGM 600 may provide a slot-style game (not shown) using the play credits on the EGM 600. For example, the slot-style game may provide one or more slot reels that spin during each game instance. The slot reel strip(s) may be configured to include winning and non-winning symbols that indicate game play outcome for one or more participating players or communally for the EGM 600. Similar to the single vested player or multiple vested players embodiments described above, the slot-style game may provide a spin of the reel(s) for one player per game instance, or may allow multiple players to vest participation for each game instance. In some embodiments, the EGM 600 may size the play area of the reel strip(s) based on the number of participating players. For example, a single player game instance may provide a 1×1 or 1×3 play area (for one-reel or three-reel variants, respectively), awarding the one participating player based on the reel spin outcomes (e.g., providing any or all awards shown in the display area after the reel spin completes). In a multi-player game instance, the EGM 600 may expand the play area to include a row for each participating player (e.g., n×1, n×3, where n is the number of participating players). The EGM 600 may display one player position marker on each row of the play area to indicate which player position is assigned to that particular row. When the spinning of the reels is complete, the EGM 600 evaluates each row of the spin result and provides any awards from the row to the associated participating player. As such, the EGM 600 provides a multi-player slot-style game that can be enjoyed by a variable number of participants.

FIG. 8 is flowchart illustrating an exemplary method 800 for providing an electronic game implemented using gaming system 400 shown in FIG. 4 on the EGM 600 shown in FIGS. 6 and 7. In the example embodiment, the EGM 600 provides the wheel-based game shown in FIGS. 6 and 7, but other game types are possible. At operation 810, the EGM 600 prepares for a new game instance. The EGM 600 begins, in this example, with play credits having been previously credited to one or more credit meters on the EGM 600 using, for example, one or more of the methods 500, 550 shown in FIGS. 5A and 5B. In other embodiments, the EGM 600 may accept cash, coin, tickets, or other forms of payment to establish play credits on the EGM 600. At operation 812, the EGM 600 receives a first participation input, such as one of the players pressing their button 610 or player position marker 608. At operation 814, the EGM 600 decrements a credit meter for the first participation, thereby vesting the first player in this game instance (e.g., from a player position credit meter, or from a communal credit meter of the EGM 600).

If, at test 816, the EGM 600 is not configured for multi-player play, then the EGM 600 initiates game play for the game instance and determines a result of the game instance at operation 820 (e.g., using RNG output). At operation 822, the EGM 600 awards the participating player based on the game instance result.

If, at test 816, the EGM 600 is configured for multi-player play, then the EGM 600 initiates a participation timer at operation 830. The participation timer allows a window of time within which other players can elect to participate, and may be pre-configured on the EGM 600 or may be changed by the players via a settings user interface (not shown). At test 832, if another player input is received for another player before the participation timer expires, the EGM 600 decrements a credit meter based on this extra participation (e.g., similar to operation 814). When, at test 836, the participation timer expires, the EGM 600 determines the game instance results at operation 820 (for any and all of the participating players) and awards the players based on the game instance results at operation 822.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming system comprising an electronic gaming machine (EGM), the EGM comprising:
   a display device horizontally mounted in a cabinet housing such that a top surface of the display device is horizontal and forms some or all of a table surface;
   a reader device configured to wirelessly detect tagged items within a detection range; and
   an EGM processor configured to execute instructions stored in at least one memory that, when executed, cause the EGM processor to at least:
     detect, using the reader device, the presence of a first tagged item within the detection range;
     determine a tag identifier (ID) of the first tagged item;
     transmit a tag detection message to a gaming support server, the tag detection message including the tag ID of the first tagged item;
     receive, from the gaming support server, a response message including an amount of play credits to be added to a credit meter of the EGM;
     increment a first credit meter on the EGM by the amount of play credits identified in the response message; and
     conduct instances of game play of an electronic game on the display device, each instance of game play decrementing the first credit meter to enable play.

2. The gaming system of claim 1 further comprising the gaming support server, the gaming support server comprising a server processor configured to execute instructions that, when executed, cause the server processor to at least:
   receive an order details message from a point of sale (POS) device, the order details message including the tag ID of the first tagged item;
   determine the amount of play credits based on the order detail message; and store a tagged item record in a database, the tagged item record identifies the tag ID of the first tagged item and the determined amount of play credits;

receive the tag detection message from the EGM;

look up the determined amount of play credits from the database based on the tag ID; and transmit the response message to the EGM.

3. The gaming system of claim 2, wherein the order details message further includes a menu item ID identifying one of a beverage item and a food item included in a purchase order, wherein determining the amount of play credits includes determining the amount of play credits associated with the menu item ID from a preconfigured database of menu item IDs and associated play credits to provide with a purchase of that menu item ID.

4. The gaming system of claim 2, wherein the order details message further includes a total amount of a purchase order, wherein determining the amount of play credits includes determining the amount of play credits based on one of (1) a percentage of the total amount of the purchase order and (2) a play credit tier amount identified in a tiered data structure that identifies pre-defined ranges of purchase order amounts and associated amounts of play credits to be provided with purchase orders falling within that tier.

5. The gaming system of claim 2, wherein the EGM further includes at least one wireless beacon configured to broadcast a unique ID (UID) of the EGM, wherein one or more of the gaming support server and the EGM are configured to automatically detect the presence of a mobile device of a player based on the mobile device detecting the broadcast of the UID by the EGM.

6. The gaming system of claim 5, wherein the EGM processor is further configured to receive a transfer of play credits to the first credit meter in response to a transfer request initiated by the mobile device.

7. The gaming system of claim 2 further comprising the POS device, the POS device comprising an RFID reader device and a POS processor configured to execute instructions that, when executed, cause the POS processor to at least:

receive order data for a purchase transaction;

receive the tag ID from a scan of the tagged item during order preparation; and create and transmit the order details message to the gaming support server.

8. The gaming system of claim 7, wherein the order data identifies menu items associated with a plurality of player positions at the EGM, wherein the POS processor is further configured to:

receive tag IDs for a plurality of tagged items scanned during order preparation; and associate each tagged item of the plurality of tagged items with a particular player position of the plurality of player positions.

9. The gaming system of claim 1, wherein the reader device is an active radio-frequency identification (RFID) reader configured to detect RFID tags, wherein the first tagged item includes an RFID tag.

10. The gaming system of claim 9, wherein the first tagged item is one of a beverage container and a food plate used to serve a beverage or food in response to a purchase order.

11. The gaming system of claim 9, wherein the first tagged item is a token device including the RFID tag, the token device is delivered to the EGM in response to a purchase order.

12. The gaming system of claim 1, wherein the first credit meter is configured as a communal credit meter used for all instances of game play on the EGM.

13. The gaming system of claim 1, wherein the EGM provides a plurality of player positions, wherein the EGM manages a plurality of player position credit meters, one player position credit meter for each player position of the plurality of player positions, wherein the first credit meter is one of the plurality of player position credit meters.

14. The gaming system of claim 13, wherein the response message identifies a first player position of the plurality of player positions, wherein incrementing the first credit meter further includes incrementing a player position credit meter associated with the first player position.

15. The gaming system of claim 13, wherein the tag detection message further includes identification of a player position of the plurality of player positions, wherein incrementing the first credit meter further includes incrementing the identified player position.

16. The gaming system of claim 1, wherein conduct instances of game play of an electronic game on the display device includes providing a wheel game on the display device, the wheel game including at least one marker displayed on the display device, wherein the EGM further includes a touchscreen device configured to receive player inputs on the at least one marker displayed on the display device.

17. The gaming system of claim 16, wherein the wheel game is a multiplayer game that includes a player position marker for each player position of a plurality of player positions, wherein each player position marker of the plurality of player positions generates a game result on a game wheel independent of the other player position markers.

18. The gaming system of claim 1, wherein the table surface includes a plurality of player position markers, each player position marker is associated with a player position supporting an individual player.

19. The gaming system of claim 1, wherein conducting instances of game play of the electronic game on the display device includes providing a multiplayer slot-style game configured to dynamically determine a size of a play area for a particular game instance based on a number of players participating in that game instance.

20. The gaming system of claim 1, wherein conducting instances of game play of the electronic game on the display device includes awarding, upon a winning outcome, one or more of (1) free food or beverages and (2) free play credits.

* * * * *